(12) United States Patent
Takakura

(10) Patent No.: US 6,704,160 B2
(45) Date of Patent: Mar. 9, 2004

(54) FEEDBACK CONTROL SYSTEM, CONTROL METHOD, MAGNETIC DISK UNIT AND METHOD OF CONTROLLING MAGNETIC DISK UNIT

(75) Inventor: Shinji Takakura, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 297 days.

(21) Appl. No.: 09/816,082

(22) Filed: Mar. 26, 2001

(65) Prior Publication Data

US 2002/0003677 A1 Jan. 10, 2002

(30) Foreign Application Priority Data

Mar. 30, 2000 (JP) ........................................ 2000-095958

(51) Int. Cl.$^7$ ............................................... G11B 5/596
(52) U.S. Cl. ................... 360/78.09; 360/78.06
(58) Field of Search ..................... 360/78.09, 78.03, 360/78.06; 318/610, 560

(56) References Cited

U.S. PATENT DOCUMENTS

| | | | |
|---|---|---|---|
| 4,916,635 A | | 4/1990 | Singer et al. |
| 5,202,821 A | * | 4/1993 | Bauck et al. .................. 700/42 |
| 5,532,926 A | * | 7/1996 | Dunn et al. .................... 700/73 |
| 5,764,017 A | * | 6/1998 | Bauck ......................... 318/610 |
| 6,078,457 A | * | 6/2000 | Suzuki et al. ............. 360/73.03 |
| 6,140,791 A | * | 10/2000 | Zhang ......................... 318/632 |
| 6,153,998 A | | 11/2000 | Takakura |

OTHER PUBLICATIONS

Hiroshi Fujimoto, et al., The Transaction of the Institute of Electrical Engineers of Japan, vol. 117–D, No. 5, pp. 645–654, "New Digital Redesign Method in Used of N–Delay Control", 1997.

Pierre T. Kabamba, IEEE Transactions on Automatic Control, vol. AC–32, No. 9, pp. 772–783, "Control of Linear Systems Using Generalized Sampled–Data Hold Functions", Sep. 1987.

* cited by examiner

Primary Examiner—David Hudspeth
Assistant Examiner—K. Wong
(74) Attorney, Agent, or Firm—Oblon, Spivak, McClelland, Maier & Neustadt, P.C.

(57) ABSTRACT

A feedback control system applicable to a magnetic disk unit is capable of improving the accuracy of positioning at a low sampling frequency. The feedback control system comprises a feedback control unit (13) that samples a differential signal representing a difference between a desired value (11) and an output provided by a controlled device (17) at a sampling frequency and produces a control command value every time the differential signal is sampled, a multigain means (14) that divides one sampling period into a combination of a plurality of time periods ($T_1$ to $T_N$) according to a predetermined time period dividing rule and allots gains to the plurality of time periods, respectively, according to a predetermined gain allotting rule, a multihold means (15) that holds the products of the control command value and the gains allotted by the multigain allotting means as fixed values for the time periods and generates a control waveform, and a driving means (16) that applies the control waveform generated by the multihold means to the controlled device.

9 Claims, 10 Drawing Sheets

ACTUATOR CHARACTERISTIC WHEN A ZERO-ORDER HOLDER IS USED FOR DIGITIZATION
(SAMPLING FREQUENCY: 4.2 kHz)

PHASE RECOVERY WHEN THE ZERO
POINT IS CHANGED
(SAMPLING FREQUENCY: 4.2 kHz)

CONTROL COMMAND OUTPUT TIMING WHEN
A GENERALIZED HOLD FUNCTION R(T) IS USED

CONTROL COMMAND OUTPUT TIMING WHEN A MULTIHOLDER
ACCORDING TO THE PRESENT INVENTION IS USED

OPEN-LOOP CHARACTERISTICS
(SAMPLING FREQUENCY: 33.6 kHz)

VCM NOMINAL MODEL

CHARACTERISTICS WHEN THE NOMINAL MODEL IS
DIGITIZED BY USING A ZERO-ORDER HOLDER
(OPERATION TIME LAG: 35 μs)

VCM DISCRETE MODEL HAVING
A DESIRABLE ZERO POINT

FREQUENCY CHARACTERISTICS OF MULTIHOLDER

OPEN-LOOP CHARACTERISTICS
ON A SAMPLE POINT
(MULTIRATE CONTROL)

OPEN-LOOP CHARACTERISTICS ON A SAMPLE POINT
(CONVENTIONAL FEEDBACK CONTROL SYSTEM)

SENSITIVITY CHARACTERISTICS ON
A SAMPLE POINT (MULTIRATE CONTROL)

SENSITIVITY CHARACTERISTICS ON A SAMPLE POINT
(CONVENTIONAL FEEDBACK CONTROL SYSTEM)

HISTOGRAM OF POSITIONAL ERRORS
(MULTIRATE CONTROL)
(3σ =213.8)

HISTOGRAM OF POSITIONAL ERRORS
(CONVENTIONAL FEEDBACK CONTROL SYSTEM)
(3σ =248.2)

MEASURED NOISE DURING POSITIONING CONTROL

FEEDBACK CONTROL SYSTEM, CONTROL METHOD, MAGNETIC DISK UNIT AND METHOD OF CONTROLLING MAGNETIC DISK UNIT

BACKGROUND OF THE INVENTION

1. Field of the Invention

The present invention relates to a feedback control system, a control method, a controller for controlling a magnetic disk unit, and a method of controlling the magnetic disk unit. More particularly, the present invention relates to positioning the magnetic head of a magnetic disk unit.

2. Description of the Related Art

Generally, a digital control system including a microcomputer is employed for positioning the head of a magnetic disk unit.

In the digital control system, the microprocessor calculates a command value on the basis of position information about the position of the head of the magnetic disk unit given through an A/D converter to the microprocessor, the calculated command value is given as a control command through a D/A converter to a drive unit for driving a voice coil motor (VCM), i.e., an actuator included in the magnetic disk unit.

High-order resonance characteristic with a sampling frequency of the actuator is very important to achieve precision positioning control by the digital control system. When the sampling frequency is sufficiently high relative to a desired control band and the high-order resonance mode of the actuator is lower than a Nyquist frequency, the design of a control system based on $H^\infty$ control theory and taking into consideration the influence of the high-order resonance mode is possible, and a digital control system similar to a continuous control system can be constructed. In such a case, highly accurate positioning can be comparatively easily achieved.

However, the magnetic disk unit has difficulties in increasing the sampling frequency for many reasons and it is difficult to set the high-order resonance mode of the actuator in a high-frequency band. Therefore, in most magnetic disk units, the resonance mode arises at a frequency in a frequency band beyond the Nyquist frequency and near the Nyquist frequency. The Nyquist frequency is half the sampling frequency.

Under such circumstances, it is difficult for the present control method to provide the open-loop characteristic of a feedback control system with sufficient phase margin and gain margin. Thus, it is very difficult to enhance robustness with the variation of the actuator characteristic and to achieve accurate positioning.

Thus, it is very difficult for the conventional digital control system to achieve accurate positioning at a low sampling frequency.

SUMMARY OF THE INVENTION

Accordingly, it is an object of the present invention to solve the foregoing problems in the prior art and to provide a feedback control system and a control method capable of avoiding the influence of the high-order resonance mode of an actuator and of achieving accurate positioning even in a state where a sampling frequency is not sufficiently high for a desired control band, and a magnetic disk unit and a control method capable of achieving accurate positioning.

With the foregoing object in view, a feedback control system for controlling a device according to the present invention comprises: a feedback control unit configured to sample a differential signal representing a difference between a desired value and an output provided by the device at a sampling frequency, and producing a control command value; a multigain unit configured to divide one sampling period into a combination of a plurality of time periods according to a predetermined time period dividing rule, and to allot gains in the plurality of time periods, respectively, according to a predetermined gain allotting rule; a multihold unit configured to hold products of the control command value and the gains allotted by the multigain unit as fixed values for the time periods, and to generate a control waveform; and a driving unit configured to apply the control waveform generated by the multihold unit to the device.

Preferably, the predetermined time period dividing rule and the predetermined gain allotting rule set a zero point in a transfer function associated with sampling and digitizing the differential signal at the sampling frequency, the zero point being different from a zero point when the gain is set at "1" in the sampling period.

Preferably, the predetermined time period dividing rule and the predetermined gain allotting rule lower the gain of the frequency characteristic of the multihold unit in a frequency band including a mechanical resonance point of the device.

Preferably, the plurality of time periods have different time lengths, respectively.

Preferably, the predetermined gain allotting rule produces a positive feedback control in one of the plurality of time period.

According to the present invention, a feedback control system for controlling a device comprises: a feedback control unit configured to sample a differential signal representing a difference between a desired value and an output provided by the device at a sampling frequency, and to produce a control command value; a waveform generator configured to divide one sampling period into a combination of a plurality of time periods according to a predetermined time period dividing rule and to generate a control waveform for each time period; and a driving unit configured to apply the control waveform generated by the waveform generator to the device; wherein the predetermined time period dividing rule reduces a gain of a frequency characteristic of the waveform generator in a frequency band including a mechanical resonance point of the device.

According to the present invention, a feedback control method for controlling a device comprises: sampling a differential signal representing a difference between a desired value and an output provided by the device at a sampling frequency; generating a control command value; dividing one sampling period into a combination of a plurality of time periods according to a predetermined time period dividing rule; allotting gains to the plurality of time periods, respectively, according to a predetermined gain allotting rule; holding products of the control command value and the gain as a fixed value for the time period; generating a control waveform; and applying the control waveform to the controlled device.

According to the present invention, a magnetic disk unit including an actuator for moving a magnetic head comprises: a feedback control unit configured to sample a differential signal representing a difference between a desired value to be used for positioning the actuator and an output provided by the actuator at a sampling frequency and to produce a control command value; a multigain means configured to divide one sampling period into a combination of a plurality of time periods according to a predetermined time period dividing rule, and to allot gains to the plurality of time periods, respectively, according to a predetermined gain allotting rule; a multihold unit configured to hold the product of the control command value and the gain allotted by the multigain unit as a fixed value for the time period, and to generate a control waveform; and a driving unit configured to apply the control waveform generated by the multihold unit to the actuator.

Background idea on the basis of which the present invention has been made and the technical idea of the present invention will be described.

Generally, a digital control system includes necessarily a phase lag due to digitization and an operation time lag. Particularly, digitization causes a great phase lag and a phase lag starts developing in a frequency band far lower than a Nyquist frequency. The phase lag is a significant factor that restricts the control performance of digital control. Generally, a phase lead compensating device included in a feedback control system of a digital control system is used to compensate the phase lag. Gain margin is reduced and hence stability is deteriorated by the strong phase lead compensation by the phase lead compensating device. Therefore, the phase lag cannot be greatly recovered by the phase lead compensating device. Consequently, the control band is limited to a very low frequency band as compared with the sampling frequency; that is, sufficient phase margin and gain margin of an open-loop characteristic can be secured even if the same sampling frequency is used, provided that the phase lag due to digitization can be reduced, so that positioning accuracy can be improved. Accordingly, the present invention pays attention to phase lag due to digitization.

A zero-order sample holder holds a value sampled at sampling time for a sampling period. A zero-order sample holder is a easily realizable piece of hardware and hence the same is employed in many digital controllers. Phase lag due to digitization is caused by the position of the zero point of a transfer function when a zero-order sample holder is used. The phase lag due to digitization can be changed by changing the position of the zero point of the transfer function.

On the other hand, although a zero-order sample holder can be easily formed, it is not expedient to use a zero-order sample holder from the viewpoint of the ability of a feedback control system. Various high-order sample holders superior to zero-order sample holders in phase characteristic have been proposed. However, those previously proposed high-order sample holders are difficult to realize and are deemed to be scarcely practically feasible.

The present invention reduces phase lag due to digitization by using a easily realizable zero-order sample holder. The present invention executes a multirate control that performs an output operation a plurality of times in one sampling period to make the transfer function of an actuator have a zero point at a specified position. Thus, phase lag due to digitization can be reduced by using hardware similar to conventional hardware employing a zero-order sample holder.

Avoidance of the effect of the mechanical resonance point of an actuator is another problem. The excitation of the mechanical resonance point by multirate control causes an inter-sampling-point oscillation. The present invention sets optimum values for time length and gain of multirate control output to avoid exciting the mechanical resonance point of the actuator when carrying out multirate control.

Thus, the present invention has been made on a background that, although sampling frequency and the mechanical resonance point of the actuator must be raised to achieve accurate positioning, it is impossible to form a system that meets such conditions in a magnetic disk unit.

As mentioned above, the present invention uses multirate control for feedback control, and determines the position of the zero point of a digitization model optionally, so that a phase lag due to digitization can be recovered greatly and a feedback control system according to the present invention has a phase margin and a gain margin which are greater than those of the conventional feedback control system. At the same time, the excitation of the mechanical resonance point is avoided by setting time allotment and gain for multirate control output.

DESCRIPTION OF THE EMBODIMENTS

Embodiment of the present invention will be described hereinafter with reference to the accompanying drawings.

Figure 1:
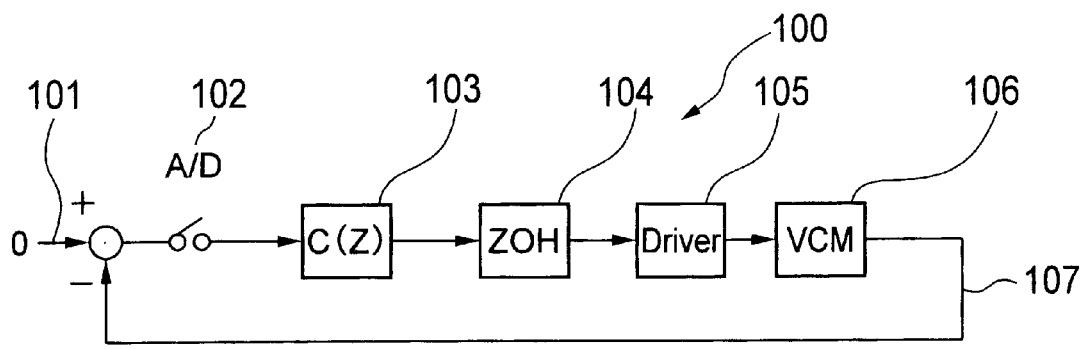
FIG. 1 is a block diagram of a conventional feedback control system.
Figure 2:
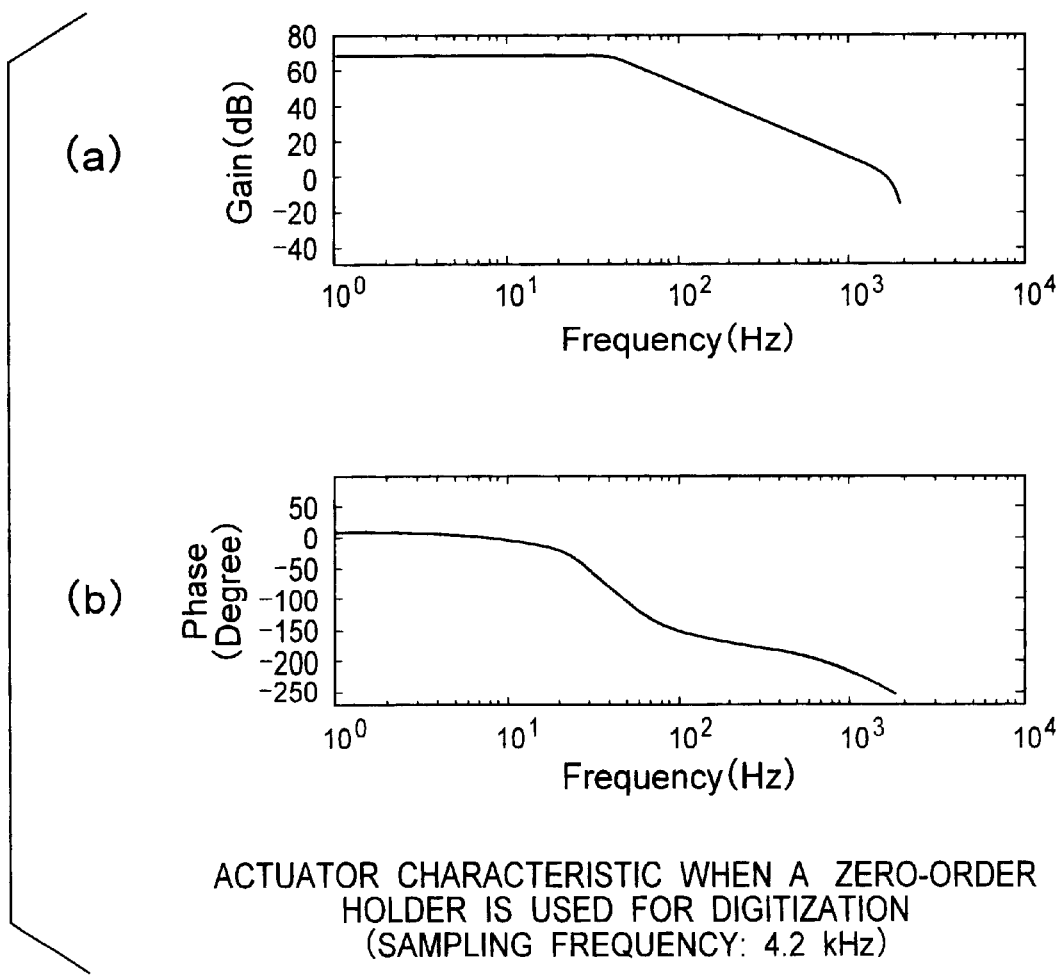
FIGS. 2(a) and 2(b) are graphs showing the gain characteristic and phase characteristic, respectively, of an actuator when a zero-order sample holder is used for digitization.

Referring to FIG. 1 showing a conventional feedback control system 100, a positional error, i.e., the difference between a desired value 101 and an output 107 provided by an actuator 106, i.e., a controlled device, is subjected to A/D conversion by an A/D converter 102. A feedback control unit 103 samples a digital positional error provided by the A/D converter 102 at a predetermined sampling period, calculates a control command value every time the digital positional error is sampled. A zero-order sample holder 104 holds the control command value calculated by the feedback control unit 103 for the sampling period and gives the same with a delay corresponding to an operation time through a driver to an actuator 106. Given that the actuator 106 is a simple second-order system, the actuator 106 shows a gain characteristic and a phase characteristic as shown in FIG. 2. In this case, sampling frequency is 4.2 kHz. It is known from FIG. 2 that the phase of the actuator 106 starts lagging from a band considerably lower than the Nyquist frequency. This phase lag is a factor that restricts control performance significantly.

Figure 3:
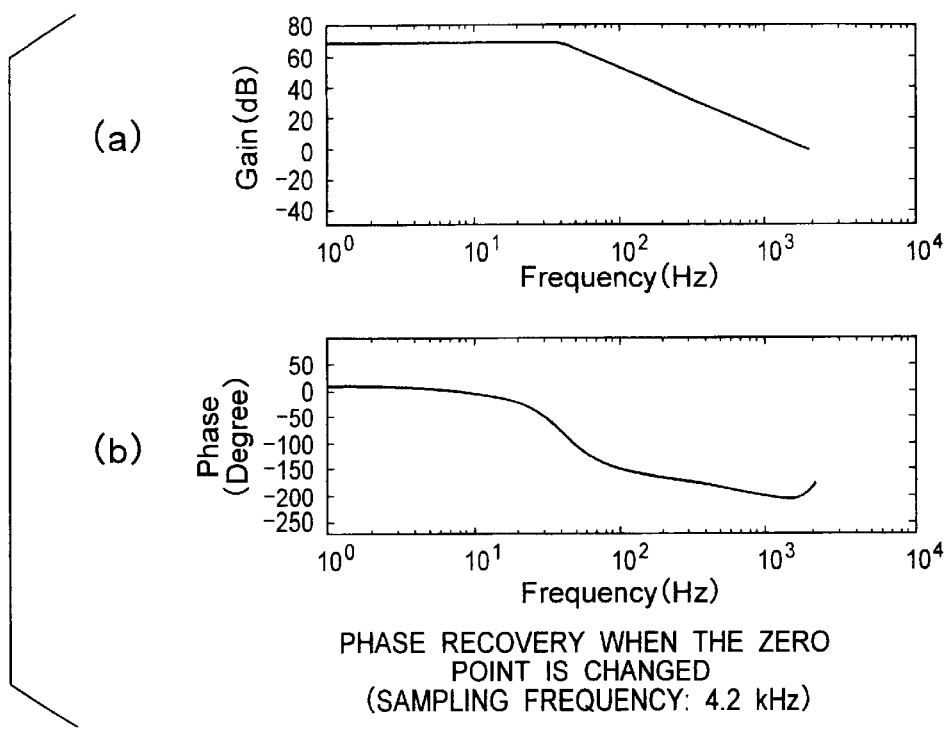
FIGS. 3(a) and 3(b) are graphs of assistance in explaining that phase recovery can be achieved by changing the position of a zero point, showing the gain characteristic and phase characteristic, respectively.

To investigate causes of phase lag, FIG. 3 shows changes of characteristics when the position of the pole of a transfer function is kept unchanged and only the position of the zero point is changed. It is known from the comparative observation of FIGS. 2 and 3 that the phase lag that occurs when a digital control system is formed is dependent on the position of the zero point of the transfer function on the sample point of the actuator 106. This fact indicates that the phase lag can be reduced and the control performance can be improved even if the same sampling frequency is used when the position of the zero point of the transfer function can be optionally set.

A method of changing the position of the zero point of the transfer function will be explained by using expressions.

A one-input one-output actuator model in a continuous system can be simulated by Expression (1).

$$\begin{cases} x_p(t) = A_p x_p(t) + B_p u(t) \\ y_p(t) = C_p x_p(t) \end{cases} \quad (1)$$

Figure 4:
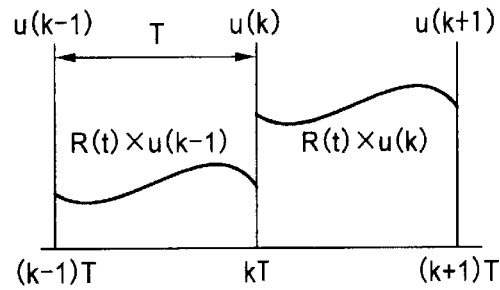
FIG. 4 is a diagram showing control command output timing when a generalized sample hold function is used.

When a control input is given to the continuous system model through a sample hold function R(t) at a sampling period T as shown in FIG. 4, response on the sample point is expressed by Expression (2).

$$\begin{cases} x_p(k+1) = A_{pz} x_p(k) + B_{pz} u(k) \\ y_p(k) = C_p x_p(k) \end{cases} \quad (2)$$

$$A_{pz} = e^{A_p \cdot T}$$

-continued
$$B_{pz} = \int_0^T e^{A_p \cdot (T-\tau)} B_p \cdot R(\tau) d\tau$$

A transfer function of a discrete system model can be calculated by using Expression (3).

$$G(z) = C_p (z \cdot I - A_{pz})^{-1} B_{pz} = \frac{C_p \cdot adj(z \cdot I - A_{pz}) \cdot B_{pz}}{|(z \cdot I - A_{pz})|} \quad (3)$$

It is known from Expression (3) that the position of the pole of the transfer function of the discrete system is determined automatically when the sampling period T is determined and the position of the zero point can be changed by an input vector $B_{pz}$. It is known from the expression expressing the input vector $B_{pz}$ that the input vector $B_{pz}$ can be changed by the sample hold function R. Therefore, the input vector $B_{pz}$ can be set to change the zero point on the sample point of the actuator optionally when the sample hold function R can be optionally selected. According to a conventional method, the value of the sample hold function R is fixed at 1 for one sampling period and the input vector $B_{pz}$ is determined automatically by determining the continuous system model and the sampling period T. The position of the zero point on the sample point of the transfer function cannot be changed. Consequently, digitization causes a phase lag inevitably. The present invention avoids phase lag due to digitization by setting a sample hold function R by a method which will be described later.

A method of determining the sample hold function R will be described hereinafter.

Kabamba et al. proposed a generalized sample hold function (GSHF) method in 1987 as a method of determining an optional sample hold function R. A paper on the generalized sample hold function method demonstrates that a sample hold function that sets a desired input vector $B_{pz}$ exists without fail, provided that the controlled device is controllable.

The practical application of the method mentioned in the paper of Kabamba et al. is encountered by the following two problems.

(1) Realization of the generalized sample hold function.
(2) Avoidance of the excitation of the mechanical resonance point of the actuator.

The method mentioned in the paper of Kabamba et al. cannot be practiced unless those two problems are solved.

The present invention gives guidelines on solving the two problems and proposes a new method.

Figure 5:
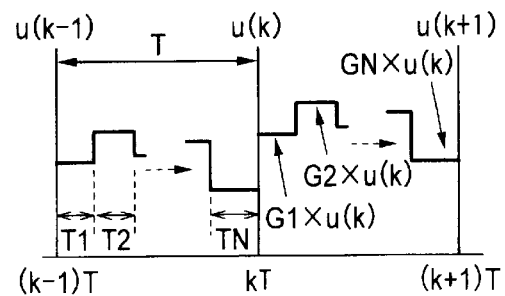
FIG. 5 is a diagram showing control command output timing when a multihold function according to the present invention is used.

A generalized sample hold function in the present invention represents a stepped shape as shown in FIG. 5 and can be given in a combination of zero-order hold for a plurality of times. The present invention applies a control input a plurality of times to the actuator by zero-order hold in one sampling period T. The sample hold function representing the stepped form as shown in FIG. 5 can be easily realized by using a zero-order sample holder and the conventional zero-order sample holder can be employed without any modification.

The present invention sets gains $G_1$ to $G_N$ for a sample hold function and time $T_1$ to $T_N$ for changing the control input, which will be described later. Thus, the excitation of the mechanical resonance point of the actuator can be avoided.

A method according to the present invention will be described hereinafter in connection with expressions.

$$\begin{cases} x_p(k+1) = A_{pz}x_p(k) + \begin{bmatrix} B_{pzl} & \cdots & B_{pzN} \end{bmatrix} \begin{bmatrix} B_N \\ \vdots \\ G_N \end{bmatrix} \begin{bmatrix} G_1 \\ \vdots \\ G_N \end{bmatrix} u(k) \\ y_p(k) = C_p x_p(k) \end{cases} \quad (4)$$

$$A_{pz} = e^{A_p \cdot T}$$

$$B_{pzl} = \int_{T-T_1}^{T} e^{A_p \cdot (T-\tau)} B_p d\tau$$

$$B_{pzN} = \int_{T-T_1-\cdots-T_N}^{0} e^{A_p \cdot (T-\tau)} B_p d\tau$$

Suppose that response on a sample point when the zero point on the sample point of a transfer function for the actuator is at a desired position is expressed by Expression (5).

$$\begin{cases} x_p(k+1) = A_{pz}x_p(k) + B_{de}u(k) \\ y_p(k) = C_p x_p(k) \end{cases} \quad (5)$$

$$A_{pz} = e^{A_p \cdot T}$$

It is know from the comparative examination of Expressions (4) and (5) that the zero point on the sample point can be disposed at a desired position and hence phase lag due to digitization can be reduced when the sample hold function as shown in FIG. 5 is used, provided that Expression (6) if Expression (6) is true.

$$B_{de} = \begin{bmatrix} B_{pzl} & \cdots & B_{pzN} \end{bmatrix} \begin{bmatrix} B_N \\ \vdots \\ G_N \end{bmatrix} \begin{bmatrix} G_1 \\ \vdots \\ G_N \end{bmatrix} \quad (6)$$

When the order of the actuator model is n and N=n, change is made n times in one sampling period. Therefore, $B_N$ is a square matrix. Thus, the gains $G_1$ to $G_N$ of the sample hold function can be uniquely determined by Expression (7).

$$\begin{bmatrix} G_1 \\ \vdots \\ G_2 \end{bmatrix} = B_N^{-1} \cdot B_{de} \quad (7)$$

Thus, a sample hold function capable of positioning the zero point of the actuator at a desired position is obtained. The existence of $B_N^{-1}$ is a problem. When the controlled device is controllable, $B_N^{-1}$ exists without fail. Therefore, the zero point on the sample point of the actuator can be disposed optionally by changing the control command a number of times equal to the order of the controlled device in one sampling period.

The avoidance of excitation of the mechanical resonance point of the actuator is another problem. Since $B_N^{-1}$ exists regardless of the times $T_1$ to $T_N$, time allotment has a degree of freedom. The gain of the sample hold function at the mechanical resonance point of the actuator is reduced by setting the times $T_1$ to $T_N$.

The frequency characteristic of the sample hold function shown in FIG. 5 is expressed by Expression (8). In the sampling period T between a sample point (k−1)T and kT in the sample hold function shown in FIG. 5, hold values in the times $T_1$ to $T_N$ are fixed values obtained by multiplying the gains $G_1$ to $G_N$ for the times $T_1$ to $T_N$ by a control command value at a sample point (k−1)T. Similarly, in a sampling period T between the sample point kT and a sample point (k+1)T, hold values in the times $T_1$ to $T_N$ are fixed values obtained by multiplying the gains $G_1$ to $G_N$ for the times by a control command value at the sample point kT.

$$G_{HOLD}(s) = \frac{1-e^{-sT_1}}{s}G_1 + \cdots + \frac{e^{-s(T_1+\cdots+T_{N-1})} - e^{-sT}}{s}G_N \quad (8)$$

The times $T_1$ to $T_N$ are determined by using Expression (8). The times $T_1$ to $T_N$ are determined by solving a constrained, nonlinear optimization problem consisting of the following performance function J and a restricting condition.

Performance Function:

$$J=|G_{HOLD}(j\omega_1)|+ \ldots +|G_{HOLD}(j\omega_m)|$$

$\omega_1$ to $\omega_m$: Frequencies to reduce the gain

Restricting Condition:

$$T_1+T_2+\ldots+T_N=T$$

The constrained, nonlinear optimization problem can be solved by sequential quadratic programming.

A case where the number of changes is greater than the order n of the actuator will be described.

In some cases where the mechanical resonance point of the actuator is in a certain frequency band, the gain of the sample hold function at the mechanical resonance point of the actuator cannot be satisfactorily reduced when the number of changes is equal to the order n of the actuator. In such cases, the number N of changes is increased to a value greater than the order n of the controlled device to adjust the gain characteristic of the sample hold function by increasing the degree of freedom of design. In such a case, the gains $G_1$ to $G_N$ meeting Expression (6) are not determined uniquely when a time allotment is set because $B_N$ is not a square matrix. In such a case, a generalized inverse matrix may be used. Although it is known that the existence of the generalized inverse matrix of $B_N$ is assured, only one special solution among infinitely many solutions meeting Expression (6) when a generalized inverse matrix is used. If this special solution is used, the hold characteristic does not necessarily have a desirable frequency characteristic. Therefore, the present invention solves a restricting nonlinear optimization problem, using the same performance function and restricting conditions to obtain times $T_1$ to $T_N$ and gains $G_1$ to $G_N$.

The effectiveness of the present invention will be demonstrated by using calculated results and experimental results.

The actuator, i.e., the controlled device, is a voice coil motor (VCM) included in a magnetic disk unit.

Figure 6:
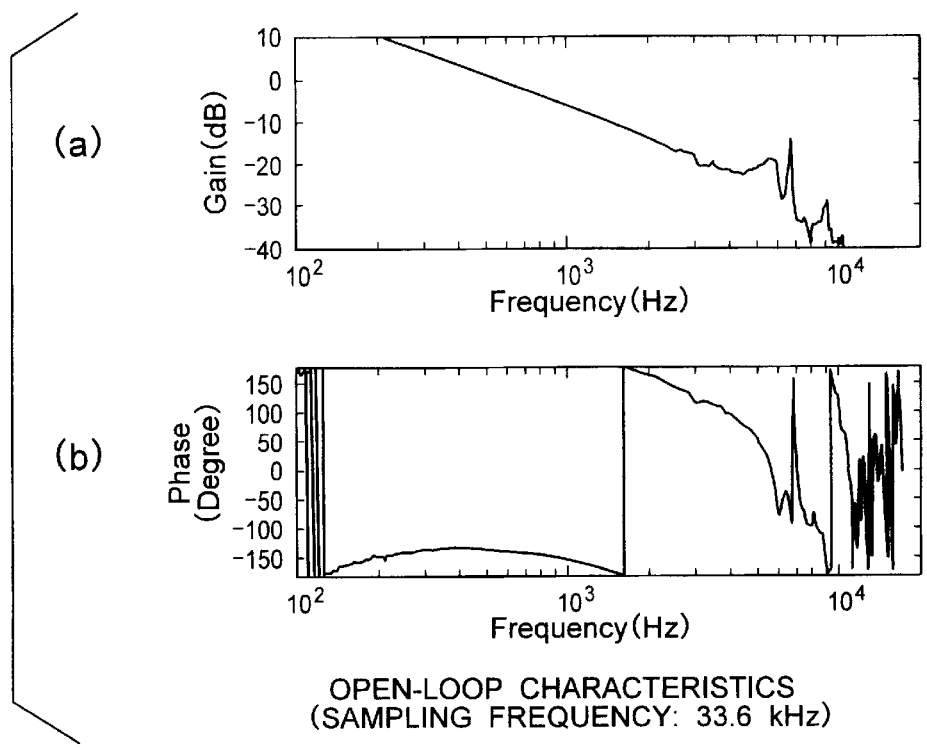
FIGS. 6(a) and 6(b) are graphs showing the gain characteristic and the phase characteristic, respectively, of an open loop, in which sampling frequency is 33.6 kHz.
Figure 7:
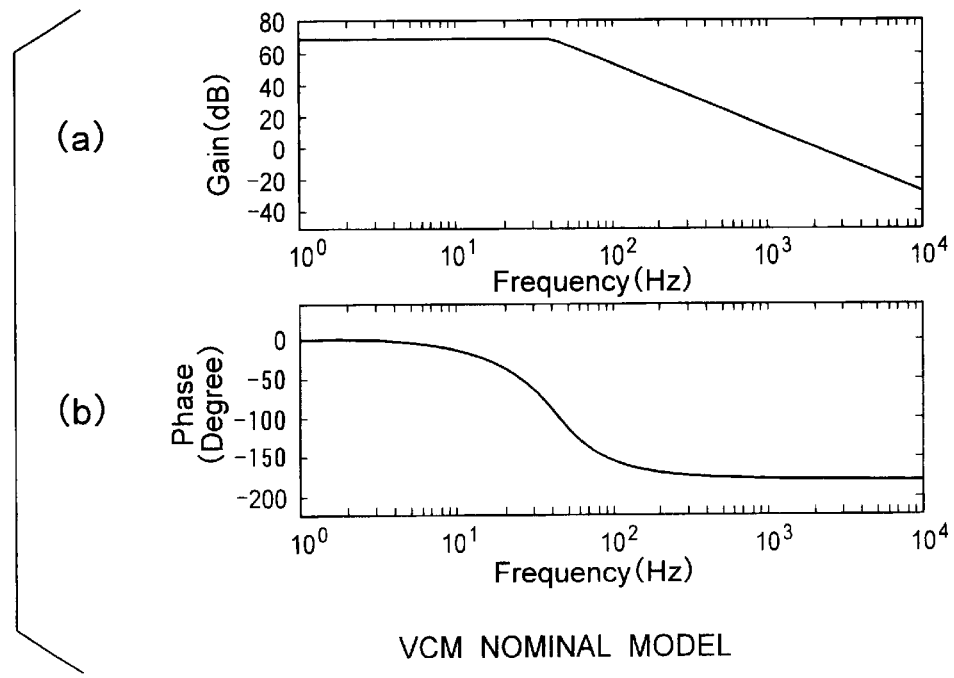
FIGS. 7(a) and 7(b) are graphs showing the gain characteristic and the phase characteristic, respectively, of a nominal model of a voice coil motor (VCM)
Figure 8:
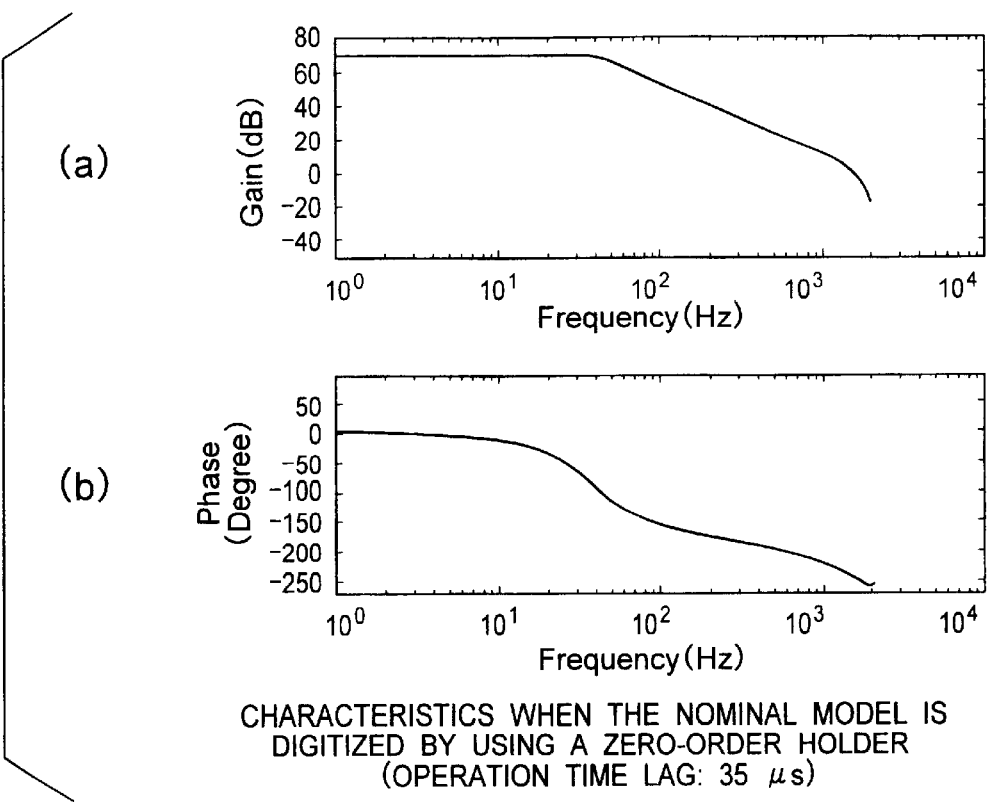
FIGS. 8(a) and 8(b) are graphs showing the gain characteristic and the phase characteristic, respectively, when the nominal model is digitized by using a zero-order holder (operation time lag: 35 $\mu$s)

An open-loop characteristic when an actuator employed in experiments is positioned at 33.6 kHz is shown in FIG. 6 to examine the frequency characteristic of the actuator. It is known from FIG. 6 that the actuator has a comparatively large mechanical resonance point at 6 kHz and 7 kHz. A continuous system nominal model of the actuator corresponding to Expression (1) is determined on the bases of those measured results. FIG. 7 shows the frequency characteristic of the nominal model. FIG. 8 shows a characteristic on a sample point when the nominal model is digitized by using a zero-order holder for a sampling frequency of 4.2 kHz and an operation time lag of 35 µs.

Figure 9:
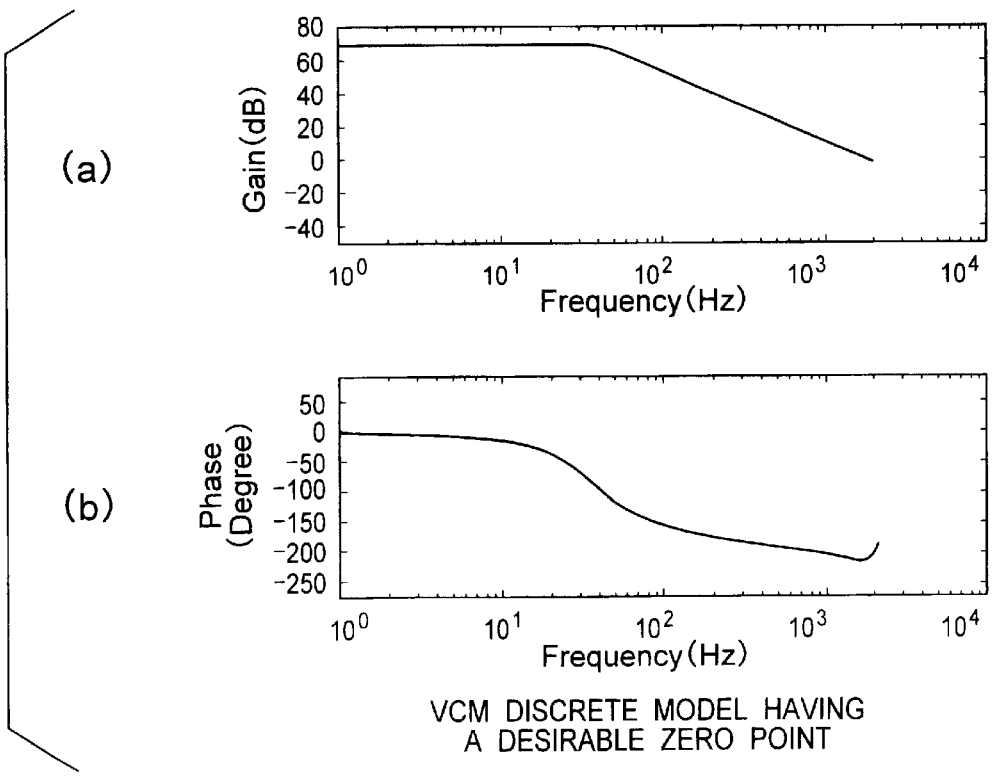
FIGS. 9(a) and 9(b) are graphs of a discrete model of a VCM having a desirable zero point, showing the gain characteristic and the phase characteristic, respectively.

A model shown in FIG. 9 having a desirable phase lag corresponding to Expression (5) is used. From this model, input vector $B_{de}$ is expressed by Expression (9). When four control commands are provided in one sampling period, Expression (10) is formed.

$$B_{de} = \begin{bmatrix} 5.75 \\ 4.11 \times 10^4 \end{bmatrix} \quad (9)$$

$$B_{de} = \begin{bmatrix} 1.14 & 1.98 & 3.40 \times 10^{-1} & 1.17 \times 10^{-1} \\ 6.02 \times 10^3 & 1.64 \times 10^4 & 6.24 \times 10^3 & 4.17 \times 10^{-4} \end{bmatrix} \begin{bmatrix} G_1 \\ G_2 \\ G_3 \\ G_4 \end{bmatrix} \quad (10)$$

From the frequency including the mechanical resonance point of the actuator, the performance function is defined by Expression (11).

$$J = |G_{HOLD}(j \cdot 6.0 \times 10^3 \cdot 2\pi)| + |G_{HOLD}(j \cdot 6.5 \times 10^3 \cdot 2\pi)| + |G_{HOLD}(j \cdot 7.0 \times 10^3 \cdot 2\pi)| \quad (11)$$

Times and gains represented by Expression (12) were determined by solving a restricting nonlinear optimization problem.

$$T_1 = 35.7 \ \mu sec \ T_2 = 95.2 \ \mu sec \ T_3 = 35.7 \ \mu sec$$

$$G_1 = 1.95 \ G_2 = 1.64 \ G_3 = 0.94 \ G_4 = -0.53 \quad (12)$$

Figure 10:
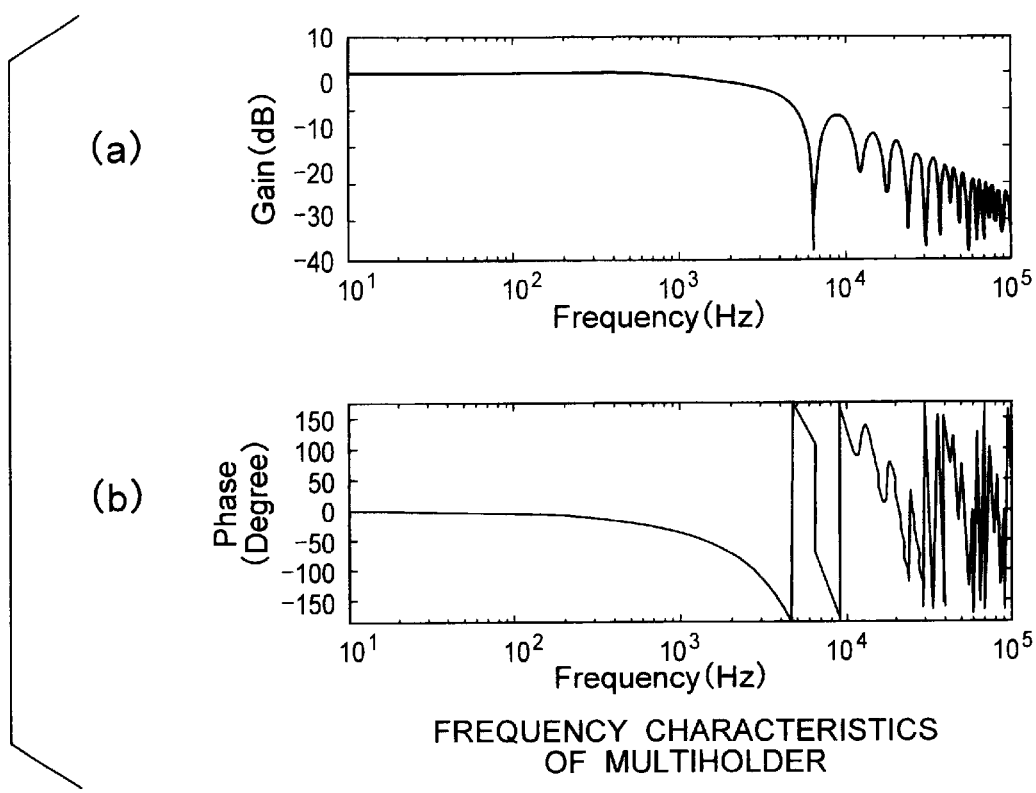
FIGS. 10(a) and 10(b) are graphs showing the gain characteristic and the phase characteristic, respectively, of a multiholder.

FIG. 10 shows the frequency characteristics of the gain and the phase the sample hold function when the foregoing control system is formed. As shown in FIG. 10, the gain decreases greatly in a frequency range between 6 kHz and 7 kHz. This frequency range corresponds to a frequency range including the mechanical resonance point of the actuator. Thus, the influence of the mechanical resonance point of the actuator can be avoided.

Figure 11:
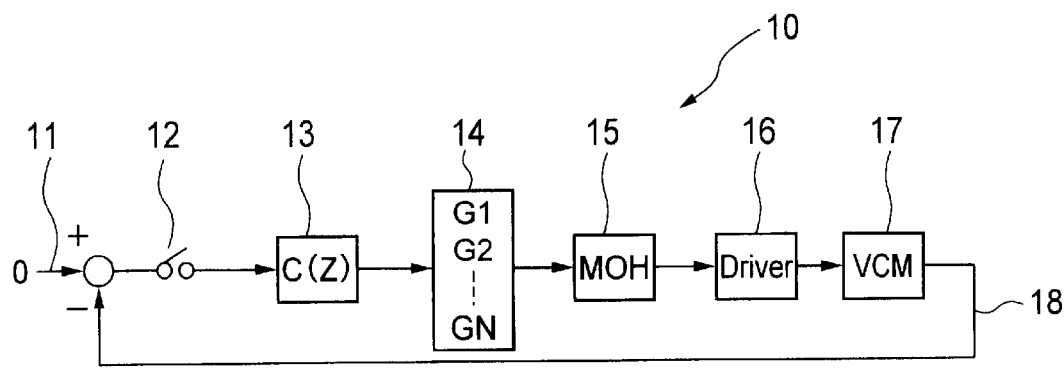
FIG. 11 is a block diagram of a control system according to the present invention.

A feedback control system 10 according to the present invention will be described with reference to FIG. 11.

The feedback control system 10 comprises an A/D converter 12 that converts an analog positional error, i.e., the difference between the output 18 of a voice coil motor (VCM) 17, i.e., a controlled device, and a desired value 11 into a corresponding digital positional error, a feedback control unit 13 that samples at a predetermined sampling frequency and produces a control command value from the digital positional error at every sampling cycle, a multigain control unit 14 that allots gains to a plurality of time bands on the basis of the results of calculation using, for example, Expression (12) in each sampling cycle, a multiholder 15 that holds the products of the control command value and the gains allotted by the multigain control unit 14 as fixed values for the time periods and a drive circuit 16 that applies the output of the multiholder 15 to the voice coil motor 17.

The multigain control unit 14 uses a gain $G_1$ in a time period $T_1$ and a gain $G_N$ in a time period $T_N$. The multiholder 15 holds an output timing waveform shown in FIG. 5 and the drive circuit 16 gives control commands to the voice coil motor 17 at times determined by the output timing waveform. The multiholder 15 may employ the same hardware as the zero-order sample holder 104.

Results of examination of the feedback control system 10 included in the magnetic disk unit will be described.

The feedback control system 10 according to the present invention is applied to a control system for positioning a voice coil motor (VCM) included in a magnetic disk unit. The VCM is used for positioning a magnetic head.

Figure 19:
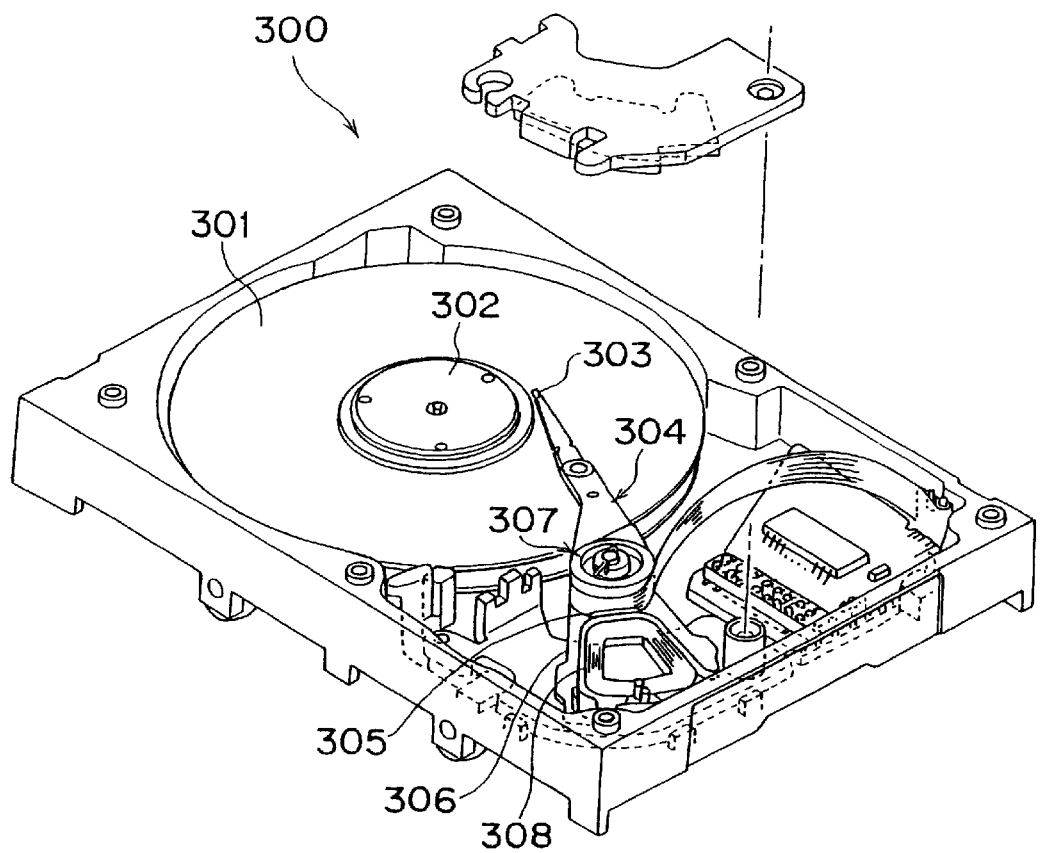
FIG. 19 is a perspective view of a magnetic disk unit.

First, the construction of a magnetic disk unit provided with a rotary actuator will be described with reference to FIG. 19. Referring to FIG. 19, disks 301 are mounted on and driven for rotation at a predetermined rotating speed by a spindle motor 302. Heads 303 having a magnetic gap are attached to free end parts of swing arms 304 having the shape of a thin plate. The head 303 is kept spaced from the disk 301 or kept in contact with the disk 301 to write information to and to read information from the disk 301. An actuator arm 305 has one end connected to the swing arm 305 and the other end connected to a VCM 17. The VCM includes a driving coil 308, a bobbin holding the driving coil 308, and a magnetic circuit having a permanent magnet and a counter yoke. The permanent magnet and the counter yoke are disposed opposite to each other on the opposite sides of the driving coil 308, respectively. The actuator arm 305 is supported on ball bearings, not shown, mounted on upper and lower parts, respectively, of a fixed shaft 307. The actuator arm 305 is driven for turning on the fixed shaft 307 by the VCM 17. Refer to U.S. Pat. No. 5,859,748 for the further details of the magnetic disk unit 300.

Figure 20:
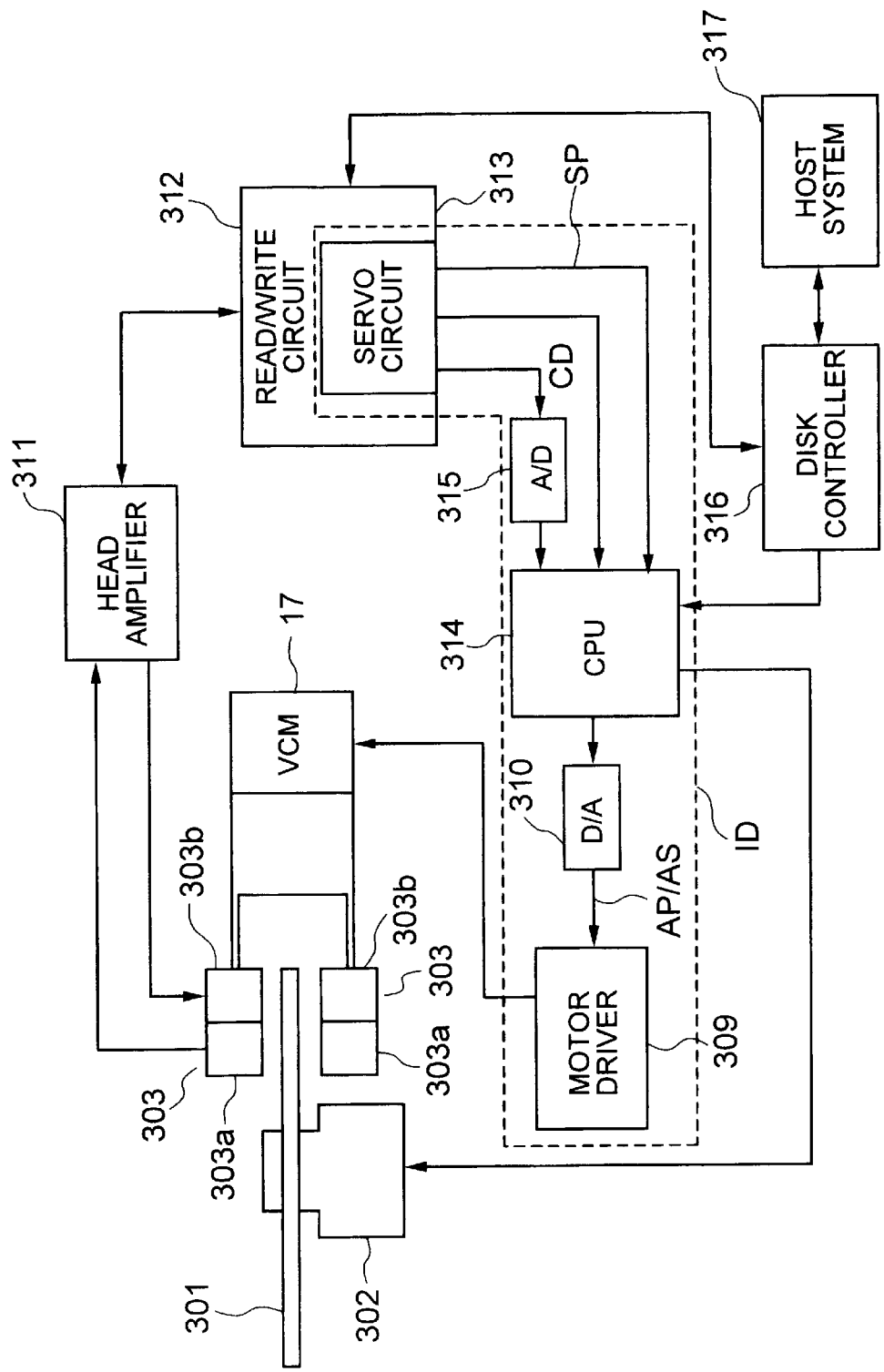
FIG. 20 is a block diagram of a control system for controlling the magnetic disk unit shown in FIG. 19.

A method of controlling the VCM 17 of the magnetic disk unit 300 will be described with reference to FIG. 20. The disks 301 have a plurality of concentric tracks. Each track has a plurality of servo areas arranged at predetermined circumferential intervals. Servo data for the seek and positioning control of the VCM 17 is stored beforehand in the servo areas. The intervals between the servo areas are determined according to a sampling frequency. The sampling frequency is, for example, on the order of 3.5 kHz for high-density recording. This magnetic disk unit 301 is supposed to be provided with the two disks 301 for convenience. Ordinarily, the magnetic disk unit 301 is provided with 1 to 5 disks. The head 303 is of a read/write separate type separately provided with a read head 303a, i.e., an MR head (magnetoresistive head), and a write head 303b, i.e., an inductive head. The heads 303 are disposed opposite to the opposite surfaces of the disks 301. A motor driver 309 supplies a driving current to the VCM 17 to drive the VCM 17. The motor driver 309 produces a driving current corresponding to a control voltage provided by a D/A converter 310 and supplies the driving current to the coil 308 of the VCM 17. The magnetic disk unit 300 further comprises a head amplifier 311, a read/write circuit 312, a servo circuit 313, a CPU 314, an A/D converter 315 and a disk controller 316. The head amplifier 311 is a driver IC that drives the read head 303a and the write head 303b. The head amplifier 311 has a read amplifier for amplifying a read signal provided by the read head 303a and a write amplifier for supplying a write current to the write head 303b. Usually, the read/write circuit 312 is a signal processing integrated circuit for processing read and write signals. The read/write circuit 312 receives a read signal provided by the read head 303a through the head amplifier 311, processes the read signal by signal processing operations to provide original data. The read/write circuit 312 modulates write data transferred thereto through the disk controller 316 by a predetermined modulation system, such as an RLL system (run length limited system), to produce a write signal and gives the write signal to the head amplifier 311. Then, the head amplifier 311 produces a write current representing the write signal and supplies the write current to the write head 303b.

The disk controller 316 is an interface between the magnetic disk unit 300 and a host system (host computer) 317. The disk controller 316 controls the transfer of signals including read and write data and access commands (read and write commands) between the magnetic disk unit 300 and the host system 317.

A servo system corresponding to the feedback control system 10 comprises the CPU 314, the servo circuit 313, the A/D converter 315, the D/A converter 310 and the motor driver 309.

The servo circuit 313 extracts servo data, i.e., information about the position of the head 303, and generates sector pulses SP, which corresponds to an interrupt signal to be given to the CPU 314, in synchronism with the sampling frequency. The servo data includes a track address (cylinder code) to be used mainly for seek control and servo burst data for position detection in a track range. The servo circuit 313 gives a track address CD extracted from the servo data to the CPU 314. The A/D converter 315 converts servo burst data extracted by the servo circuit 313 into corresponding digital data and gives the digital data to the CPU 314. The CPU 314 calculates a position for the head 303 in a range in a track (desired track) on the basis of the servo burst data. The CPU 314 recognizes the track position of the moving head 303 on the basis of the track address.

The CPU 314 executes a previously prepared program, which will be described later, for the position control of the VCM 17. The CPU 314 receives an access command (read/write command) through the disk controller 31 from the host system 317 and carries out seek control and positioning control relating with this embodiment. The CPU 314 calculates control values (digital values) by control operations for seek control and positioning control to the D/A converter 310. The program for carrying out the control method of the present invention may be previously stored in the CPU 314 or may be installed in the host system 317, i.e., a host computer, by an installation operation using a recording medium, such as a CD-ROM, a DVD or an FD.

Results of comparison between the feedback control system comprising the CPU 314, the servo circuit 313, the A/D converter 315, the D/A converter 310 and the motor driver 309 and corresponding to the feedback control system 10 according to the present invention shown in FIG. 11 and the conventional feedback control system shown in FIG. 1 will be described.

Figure 12:
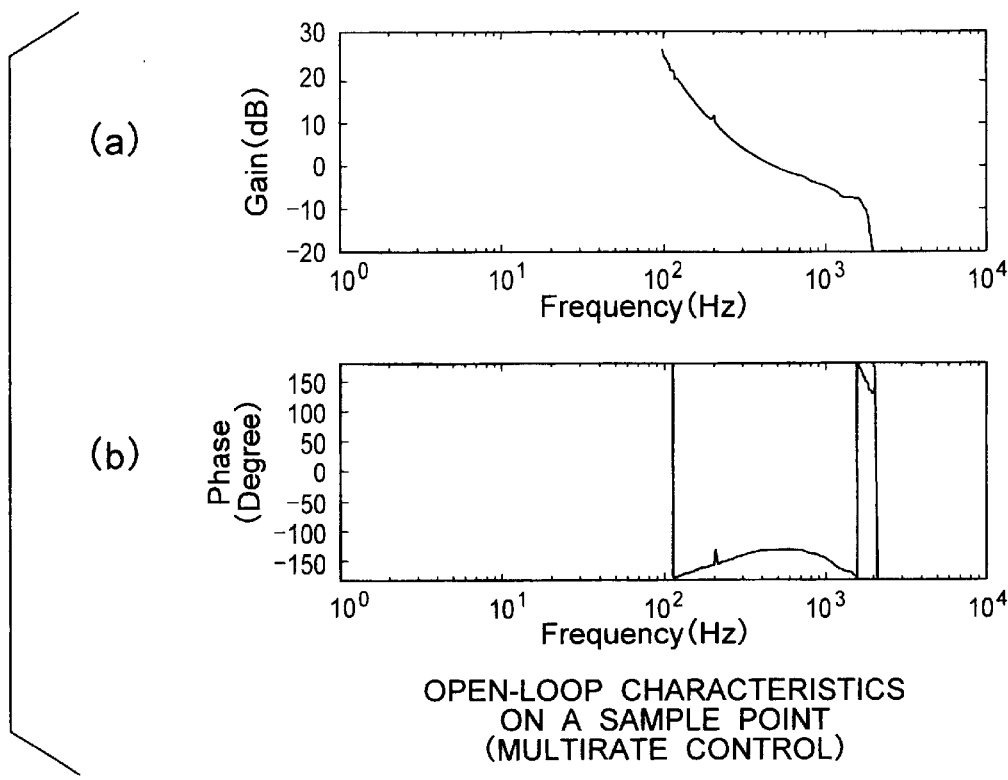
FIGS. 12(a) and 12(b) are graphs showing a measured gain characteristic and a measured phase characteristic (multirate control), respectively, of an open loop on a sample point.
Figure 13:
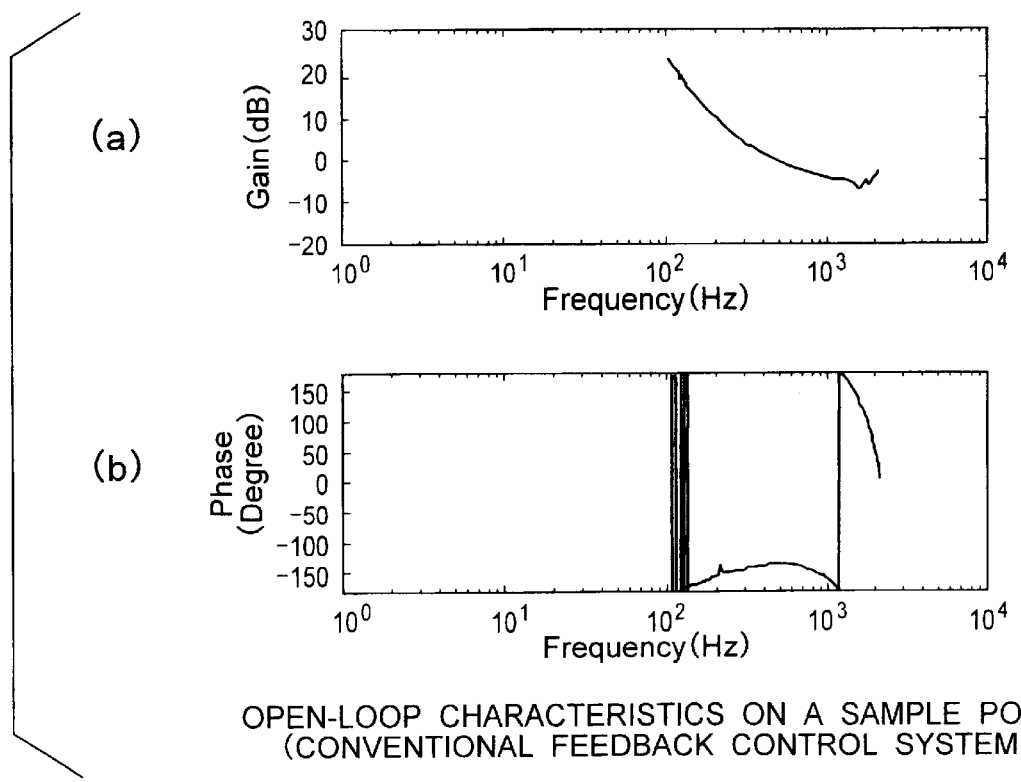
FIGS. 13(a) and 13(b) are graphs showing a measured gain characteristic and a measured phase characteristic (conventional method), respectively, of an open loop on a sample point.

FIGS. 12 and 13 show measured open-loop characteristics. FIG. 12 shows measured open-loop characteristics on a sample point when multirate control is executed by the feedback control system 10. FIG. 13 shows open-loop characteristics when the conventional feedback control system shown in FIG. 1 provided with a simple zero-order holder is used.

As obvious from the comparative examination of FIGS. 12 and 13, the method according to the present invention provides the feedback control system with a sufficient phase margin and a sufficient gain margin that cannot be provided by the conventional method.

Figure 14:
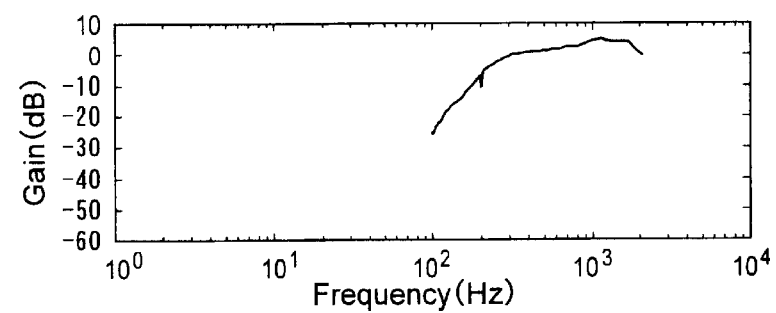
FIGS. 14(a) and 14(b) are graphs showing the gain characteristic and the phase characteristic, respectively, of sensitivity on a sample point (multirate control)
Figure 14:
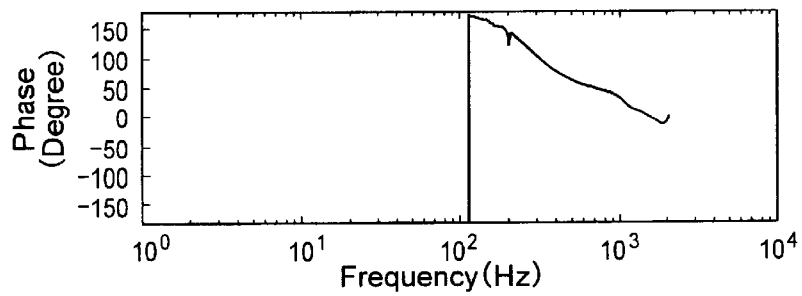
Figure 15:
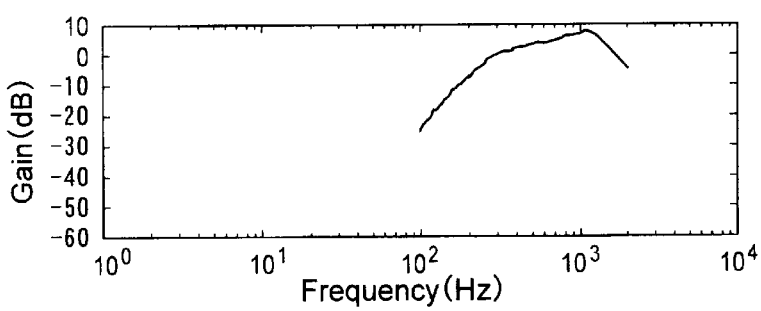
FIGS. 15(a) and 15(b) are graphs showing the gain characteristic and the phase characteristic, respectively, of sensitivity on a sample point (conventional method)
Figure 15:
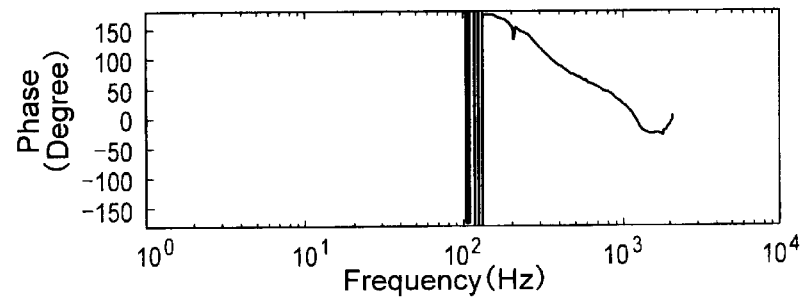

FIGS. 14 and 15 show the respective sensitivity characteristics of the method according to the present invention and the conventional method. It is known from FIGS. 14 and 15 that the method of the present invention, as compared with the conventional method, is capable of reducing the gain of sensitivity characteristic in a frequency range beyond 200 Hz.

Figure 16:
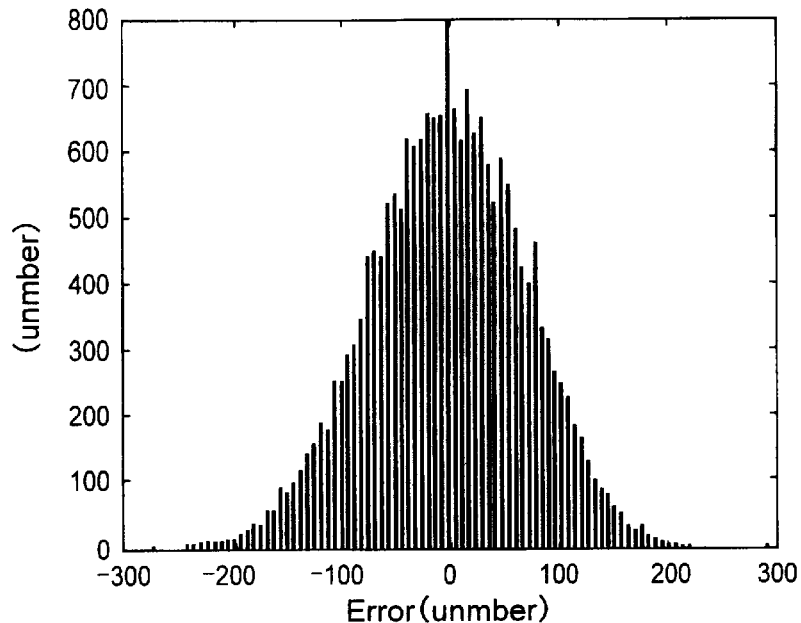
FIG. 16 is a histogram showing the distribution of positional errors when multirate control is executed.
Figure 17:
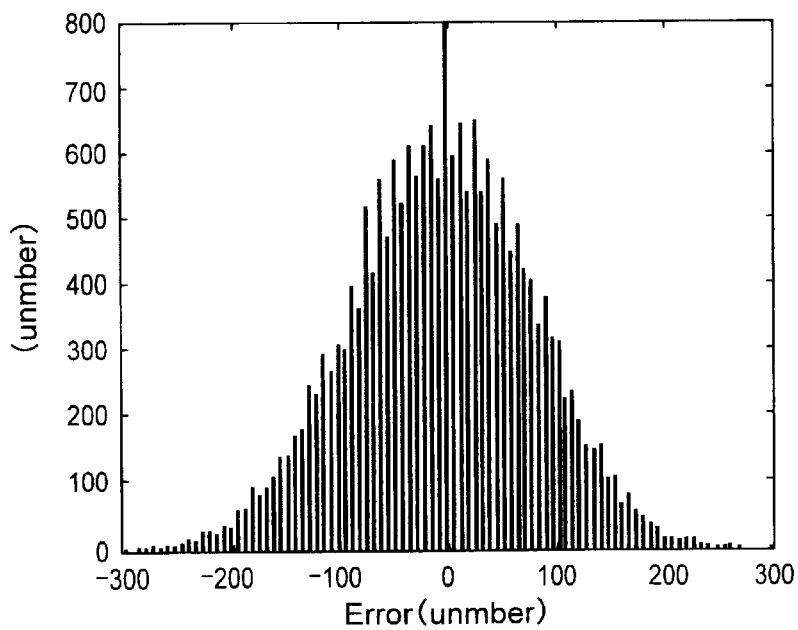
FIG. 17 is a histogram showing the distribution of positional errors when a conventional control is executed.

FIGS. 16 and 17 show measured accuracies of positioning on the sample point. The gain of the sensitivity characteristic is reduced in a frequency range beyond 200 kHz. It is known from the comparison of the values of 3σ shown in FIGS. 16 and 17 that the method of the present invention improves the positioning accuracy by about 14%. The degree of improvement of the positioning accuracy is greatly dependent on the frequency band of disturbance. It is possible that the positioning accuracy is improved by 20% or above when dominant disturbance exists in the amplifier of having a sensitivity characteristic of 200 Hz or above.

Figure 18:
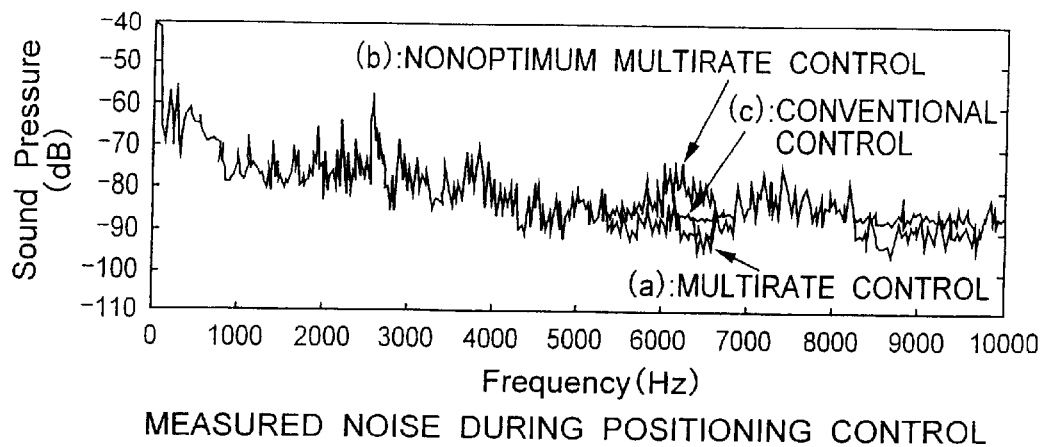
FIG. 18 is a graph showing measured noise generated during positioning control by multicontrol according to the present invention (curve (a)), nonoptimum multicontrol (curve (b)) and conventional control (curve (c))

Results of examination of control performance between sample points will be described. The magnetic disk unit is incapable of obtaining response between sample points. Therefore, control performance will be evaluated on the basis of noise generated during positioning. FIG. 18 is a graph showing measured noise generated during positioning control by multicontrol according to the present invention. In FIG. 18, a curve (a) represents measured noise when multirate control according to the present invention is executed, a curve (b) represents measured noise when an optimum time and an optimum gain for multirate control were not set and a curve (c) represents measured noise when the conventional control is executed.

The characteristic when the multirate control according to the present invention is executed (curve (a)) is satisfactory as compared with that when nonoptimum multirate control and conventional control is executed (curves (b) and (c)).

When nonoptimum multirate control is executed (curve (b)), the mechanical resonance is excited intensely at frequencies near 6 kHz. Thus, it is known that the optimum setting of change times and the gain in one sampling period as that executed by the multirate control according to the present invention is requisite.

As apparent from the foregoing description, according to the present invention, the influence of the resonance mode of the controlled device can be avoided and accurate positioning can be achieved even if the sampling frequency is not sufficiently high relative to the desired control band.

What is claimed is:

1. A feedback control system for controlling a device comprising:
   a feedback control unit configured to sample a differential signal representing a difference between a desired value and an output provided by the device at a sampling frequency, and producing a control command value;
   a multigain unit configured to divide one sampling period into a combination of a plurality of time periods according to a predetermined time period dividing rule, and to allot gains in the plurality of time periods, respectively, according to a predetermined gain allotting rule;
   a multihold unit configured to hold products of the control command value and the gains allotted by the multigain unit as fixed values for the time periods, and to generate a control waveform; and
   a driving unit configured to apply the control waveform generated by the multihold unit to the device,
   wherein the predetermined time period dividing rule and the predetermined gain allotting rule
      firstly set a zero point in a transfer function associated with sampling and digitizing the differential signal at the sampling frequency, the zero point being different from a zero point when the gain is set at "1" in the sampling period, and
      secondly lower the gain of the frequency characteristic of the multihold unit in a frequency band including a mechanical resonance point of the device.

2. The feedback control system according to claim 1, wherein the plurality of time periods have different time lengths, respectively.

3. The feedback control system according to claim 1, wherein the predetermined gain allotting rule produces a positive feedback control in one of the plurality of time period.

4. A feedback control method for controlling a device comprising:
   sampling a differential signal representing a difference between a desired value and an output provided by the device at a sampling frequency;

generating a control command value;

dividing one sampling period into a combination of a plurality of time periods according to a predetermined time period dividing rule;

allotting gains to the plurality of time periods, respectively, according to a predetermined gain allotting rule;

holding products of the control command value and the gain as a fixed value for the time period;

generating a control waveform; and applying the control waveform to the controlled device, wherein the predetermined time period dividing rule and the predetermined gain allotting rule firstly set a zero point in a transfer function associated with sampling and digitizing the differential signal at the sampling frequency, the zero point being different from a zero point when the gain is set at "1" in the sampling period, and secondly lower the gain of the frequency characteristic of the multihold unit in a frequency band including a mechanical resonance point of the device.

5. The feedback control method according to claim 4, wherein the plurality of time periods have different time lengths, respectively.

6. The feedback control system according to claim 4, wherein the predetermined gain allotting rule produces a positive feedback control in one of the plurality of time period.

7. A magnetic disk unit including an actuator for moving a magnetic head comprising:

a feedback control unit configured to sample a differential signal representing a difference between a desired value to be used for positioning the actuator and an output provided by the actuator at a sampling frequency and to produce a control command value;

a multigain means configured to divide one sampling period into a combination of a plurality of time periods according to a predetermined time period dividing rule, and to allot gains to the plurality of time periods, respectively, according to a predetermined gain allotting rule;

a multihold unit configured to hold the product of the control command value and the gain allotted by the multigain unit as a fixed value for the time period, and to generate a control waveform; and a driving unit configured to apply the control waveform generated by the multihold unit to the actuator, wherein the predetermined time period dividing rule and the predetermined gain allotting rule firstly set a zero point in a transfer function associated with sampling and digitizing the differential signal at the sampling frequency, the zero point being different from a zero point when the gain is set at "1" in the sampling period, and secondly lower the gain of the frequency characteristic of the multihold unit in a frequency band including a mechanical resonance point of the device.

8. A magnetic disk unit according to claim 7, wherein the plurality of time periods have different time lengths, respectively.

9. The feedback control system according to claim 7, wherein the predetermined gain allotting rule produces a positive feedback control in one of the plurality of time period.

* * * * *